Oct. 25, 1966   E. P. ZSELECZKY ET AL   3,281,585
MEANS FOR GENERATING A PLURALITY OF NON-LINEAR FUNCTIONS
Filed Dec. 4, 1962                                   2 Sheets-Sheet 1

Ernest P. Zseleczky
Ivan C. Gruet               Inventors

By Small, Thomas, Dunham & Marx

Patent Attorney

Oct. 25, 1966   E. P. ZSELECZKY ET AL   3,281,585
MEANS FOR GENERATING A PLURALITY OF NON-LINEAR FUNCTIONS
Filed Dec. 4, 1962   2 Sheets-Sheet 2

Ernest P. Zseleczky
Ivan C. Gruet                    Inventors

Small, Thomas, Dunham & Marx
By
                          Patent Attorney

United States Patent Office 3,281,585
Patented Oct. 25, 1966

3,281,585
MEANS FOR GENERATING A PLURALITY OF NON-LINEAR FUNCTIONS
Ernest P. Zseleczky, Morristown, and Ivan C. Gruet, Montclair, N.J., assignors to Esso Research and Engineering Company, a corporation of Delaware
Filed Dec. 4, 1962, Ser. No. 242,307
2 Claims. (Cl. 235—197)

This application is a continuation-in-part of application Serial No. 29,463, filed May 16, 1960, now abandoned.

The present invention relates to function generating circuits, to electronic circuits for such purposes, and more particularly to electronic circuits designed to convert an input voltage into a non-linear output representative of a non-linear function. A particular aspect of the invention is the conversion of an input function to an output which simulates and/or controls a non-linear industrial process in which the output bears the relation to input of a more or less dependent variable which is a non-linear function of an independent input characteristic.

For example, in a conversion process wherein certain material to be processed is fed into the process at a variable rate of feed, which feed-rate may be designated as an independent variable X, the yield or percentage conversion of said feed into a desired product may be a dependent or partially dependent variable $f(X)$. The latter may vary with changes in X in either a linear or non-linear manner. If linear, there is no difficulty in following or predicting the dependent (or partially dependent) variable, and a simple circuit may be connected or set to simulate the product output in accordance with variations in feed rate, i.e., input, into the circuit. When the relationship is non-linear, however, the problem is not so simple. Complex and costly simulator circuits and/or function generating devices are required.

As another example, suppose that in a hydrocarbon conversion process, the independent variable $t$, representing temperature, produces a yield of a certain component product which is a non-linearly dependent (or partially dependent) variable $f(t)$. For example, the yield of a particular product in the process may vary as a complex non-linear function. While the simpler non-linear functions are easily produced, the majority are difficult to obtain, and are often in error over large portions of the range of variability of the independent variable. Prior art devices are known which will roughly approximate the desired curve but they are very costly and are still deficient in accuracy. The present invention produces an output substantially identical with that desired over the entire range for any sustained operational period. Moreover, it does this with simple and inexpensive equipment.

An important object of this invention is to devise equipment and circuitry for generating non-linear functions and which will operate in a computing or a control mechanism, e.g., an analog computer, to simulate very closely and continuously the actual non-linear operating functions of the process; in other words, an analog controller to continuously vary the set points of conventional controllers.

Other objects will become more apparent as this description proceeds and therefore reference will next be made to the attached drawings, wherein:

FIGS. 1 and 3 are graphs of typical functions which may require close simulation in automation of certain processes or the like;

FIG. 5 is a more complex cricuit diagram illustrating a practical embodiment of a system combining features of FIG. 1 to 4, such as might be incorporated in an industrial analog computer, used in process control, e.g., temperature vs. feed rate functions, temperature-pressure control, or the like.

Figure 1:
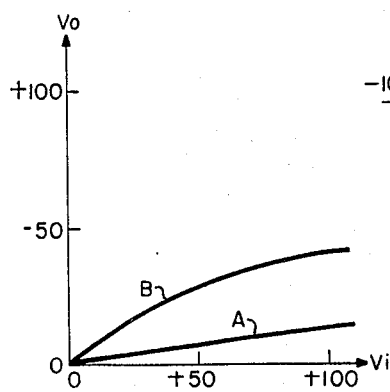
Figure 2:
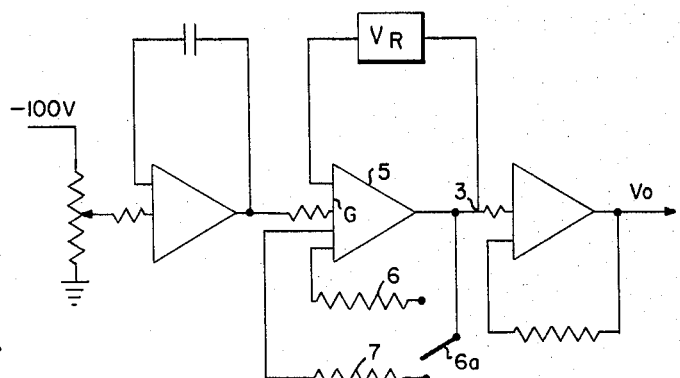
FIGS. 2 and 4 are respectively diagrams illustrating circuits which may be used for production of the functions illustrated respectively in FIGS. 1 and 3.

FIG. 1 is a graph of a function obtained from a circuit containing a "Thyrite Varistor," a commercial conducting device which has a variable resistance which decreases with increasing voltage. These devices have previously been suggested for generating non-linear functions, e.g., as in "I.R.E. Transactions on Electronic Computers," June 1958. This "Varistor" is placed in the feedback path of a more or less conventional and operational high gain D.C. amplifier. The circuit is shown in FIG. 2. In this circuit, the Varistor VR is placed between the output 3 and the grid G of the amplifier 5. The resultant output is of exponential character or essentially so. When a 0.1 megohm resistance 6 is placed in parallel with the Varistor, by closing switch 6a to its upper contact, and the voltage input to voltage output is graphed, a curve A of a low order exponential is obtained. This curve is almost flat or linear. By using a 1 megohm resistor 7 in parallel with the Varistor, closing the switch 6a on its lower contact, a higher order exponential curve B is obtained. It has much greater curvature. By addition of a variable resistance either in series or in parallel to either of these above-mentioned cases, or by substituting other resistance values for one or the other resistance 6 or 7, the curves may be modified in value to the extent desired.

Figure 3:
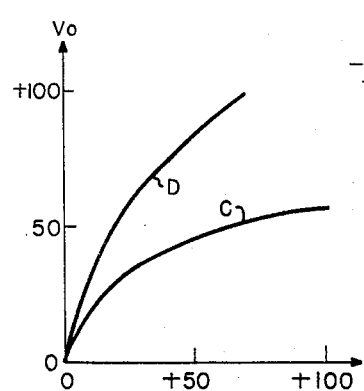
Figure 4:
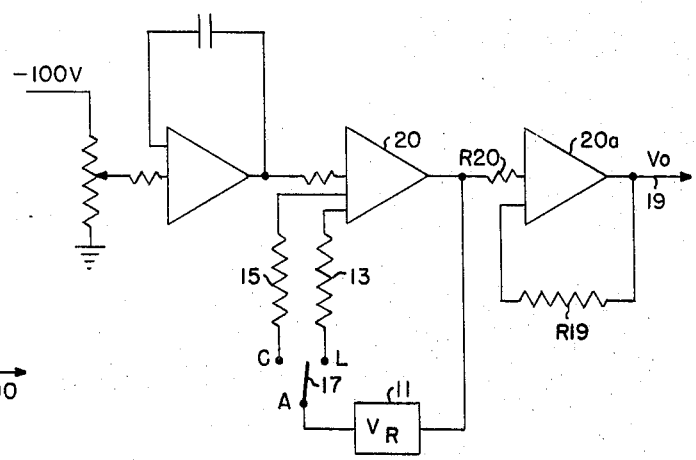

Exponentials of higher order may be obtained by placing the Varistor in series with one or more resistors. FIG. 3 illustrates curves so obtained, and FIG. 4 shows an example of suitable circuit diagram. Curve C is obtained in the low part of the voltage output of amplifier 20, and curve D in the high range of the same amplifier. In FIG. 4 the Varistor VR is shown at 11, being capable of connection alternatively in series with the high or low resistor 13, or 15, depending on setting of switch 17 to right or left. The output at 19 gives the desired function. Amplifier 20a is used for polarity reversal. By controlling the ratio of input and feedback resistance on this amplifier, the voltage output of amplifier 20 may be multiplied by a desired factor (which is equal to the ratio of resistances $R_{19}/R_{20}$.

Figure 5:
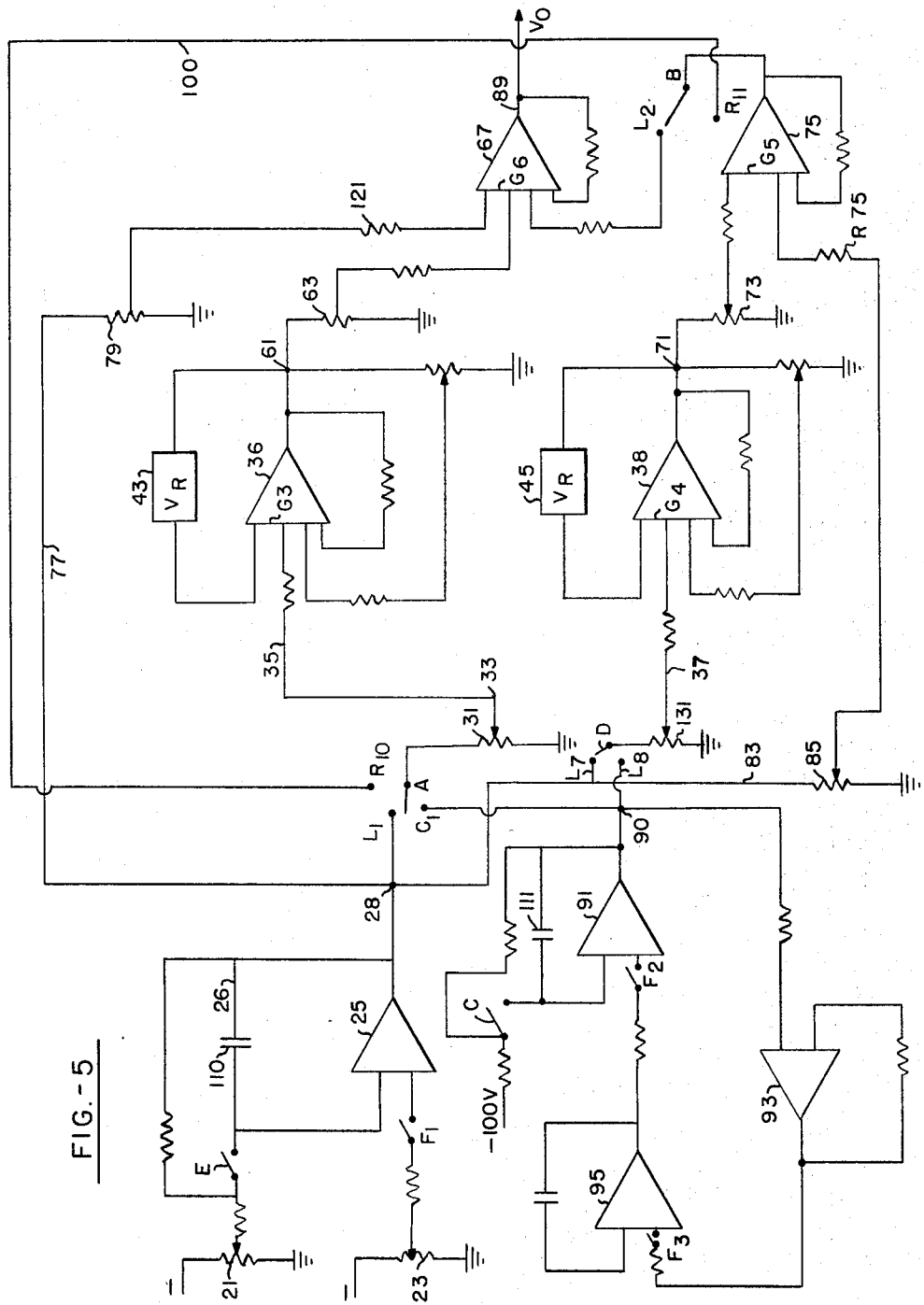

By combining in series, in parallel, or in series-parallel the outputs of two or more such circuits as those described above (one of which may be reversed in polarity for subtraction by means of the addition of an inverting amplifier such as 20a), the algebraic summation can result, when desired, in either the sum or difference of two or more outputs. FIG. 5 shows an example of a circuit for accomplishing this purpose. A plurality of circuits is shown at the right, one beginning at connection 28 and consisting of upper branch 77 with a variable resistor 79, and lower branch 83 with variable resistor 85, and continuing connections through resistor $R_{75}$ to amplifier 75, respectively. Another circuit begins at point 33 and it comprises line 35 connecting to an amplifier 36. One Varistor 43 is connected in this circuit between point 61 and the grid $G_3$ of amplifier 36 in parallel with the amplifier. Another such circuit is connected through line 37 to amplifier 38 and a Varistor 45 is contained between point 71 and the grid $G_4$ of amplifier 38. The amplifier 75 is used as a summing amplifier for the outputs of variable resistors 73 and 85. The final output amplifier 67 is used to sum algebraically the outputs of resistors 79, 63 plus that of amplifier 75 when switch B is closed on contact $L_2$. The final output at line 89 is the desired $f(X)$.

To explain the circuitry of FIG. 5 in further detail, a fixed reference voltage, e.g., −100 v., is impressed on the left upper circuit at 21, 23. When switch E is closed and switch $F_1$ is open, condenser 110 charges up to the output voltage of variable resistor 21. By opening switch E and closing $F_{1'}$ the output of amplifier 25 will vary linearly, starting at the condenser voltage. The slope of the function thus generated is equal to the voltage value available at resistor 23. The output voltage of amplifier 25 goes to the parallel branches 77, 83 at point 28. This circuit thus generates a ramp or linear function.

In the lower left circuit condenser 111 is charged when switch C is closed and $F_2$ and $F_3$ are open. On opening switch C and closing $F_2$ and $F_3$, a sine wave voltage is generated at 90. When switch A is closed on contact $C_1$, the sine wave from amplifier 91 is supplied as input to grid $G_3$ of amplifier 36. When switch D is closed on contact $L_8$, then the sine wave from amplifier 91 is supplied to the grid $G_4$ of amplifier 38. The output of this circuit 91, 93, 95 may be passed on to the right either through switch A or switch D. If A is closed on point $L_1$, the output of amplifier 25 goes to the grid $G_3$ of amplifier 36. If switch D is closed on upper contact $L_7$, the output of amplifier 25 goes to grid $G_4$ of amplifier 38. The output at 28 goes direct through resistors 79 and 121 to grid $G_6$ of the final amplifier 67 under all conditions.

The output at 28 goes also through resistors 85 and $R_{75}$ to the grid $G_5$ of amplifier 75. The output of amplifier 75 can be fed to the final amplifier 67 by closing switch B on contact $L_2$. Alternatively, it may be sent to point $R_{10}$ of switch A by closing switch B on contact $R_{11}$. When switch A is closed on $R_{10}$ and switch B on $R_{11}$, the two Varistor circuits (43, 45) are then operating in series. Hence by selecting the desired settings of switches A, B, D, various components of the system may be placed in parallel or in series, or in series and parallel. By these means the outputs may be added, subtracted by inverting one of them, or otherwise combined to give composite functions.

Variable resistances (potentiometers) 63 and 73 are used as weighting factors for each of the two Varistor circuits prior to summation.

The units which generate the ramp and sine functions respectively are well known in the art and need not be described in detail.

Variable resistance (potentiometer) 31 will diminish or attenuate either the ramp or the sine wave, depending upon whether the switch A is connected to point $L_1$ or point $C_1$. The same is true of variable resistor 131 and switch D. This results in compression or expansion of the outputs following in the circuit. Leads 77 and 83 and their connections permit further modification of the final output curve. Potentiometers 79 and 85 in these lines can be set to lessen the degree of such modification.

Those skilled in the art will readily appreciate that a multitude of output curves at the terminal $V_o$ may be obtained by various combinations and output levels of the ramp, sine wave and exponential amplifier circuits. For instance, an exponential type curve with a half cycle oscillation in the flatter part of the curve may be obtained from an algebraic summation of an input ramp function, portion of a sine wave function and a portion of an exponential function. For this purpose, the circuit of FIG. 5 could be readily employed. With switch D on position $L_8$ the sine function from the output of amplifier 91 would be applied to the input of exponential amplifier 38. The output of exponential amplifier 38 having a thus applied sine wave input would be applied through point 71 and variable resistor 73 to grid G−5 of summing amplifier 75.

With the position of switch A as shown in FIG. 5, the output of the ramp function of amplifier 25 is applied through point 28, conductor 83, variable resistor 85, and resistor 75 in parallel with the output of exponential amplifier 38 to the grid G−5 of summation amplifier 75. With switch B in the position shown in FIG. 5 (i.e. on contact L−2), the output of amplifier 75 is further amplified by amplifier 67 and made available. If additional exponential characteristic is desired, switch B may be positioned on contact $R_{11}$ whereupon the summed output of amplifier 75 would be available at contact $R_{10}$ of switch A. By placing switch A on the $R_{10}$ position, this output is applied to the input of a second exponential amplifier 36 whose output is combined with the other inputs to amplifier 67. By suitable adjustment of the numerous potentiometers and observation of the character of $V_o$ on a suitable instrument such as an oscilloscope, the output curve may be adjusted to any desired variation of exponential curves with half cycle oscillations in the flatter portion of the curve. Obviously, switching means A, D and B, along with the adjustable resistors and their various associate circuits may be positioned in an infinite number of alternative positions to produce various combinations of electrical characteristics.

The elements of electronic equipment contained in this circuit can be assembled entirely of passive elements and solid state components. By using such a circuit in connection with a process, the desirable non-linear feedback requisite for adjustment or regulation of instrument or controller set points could be accomplished. This circuit offers the possibility of closer approximation of the non-linear functions than can be obtained with present commercially available equipment. Knowing the value of one variable, e.g., temperature, the dependent variable may be continuously generated or followed as it changes.

It will be understood that equivalent and known components may be substituted in the system by the skilled in the art without departing from the spirit or purpose of this invention. It is intended to cover such by the appended claims and it is intended that the claims be interpreted broadly, within the limitations of the prior art.

What is claimed is:

1. A circuit for generating dependent non-linear functions from an independently variable input which comprises, in combination, a pair of branched circuits, means for connecting said branched circuits to said variable input; each of said branched circuits including, a high gain D.C. amplifier including a feedback circuit comprising a conductor having a resistance inversely related to input voltage, and a potentiometer connected in parallel with said conductor, means for adjusting the potentiometer in the respective branched circuits, means for selectively connecting said circuits to one another either in series or in parallel and a common totalizer for the combined output of said branched circuits.

2. An electronic analog controller having an output characteristic which is a non-linear function of its independently variable input, said controller comprising in combination a ramp function generator, a sine wave generator, an additional function generator selectively connectable to either of said first two generators, said additional function generator comprising a circuit which includes a high gain D.C. amplifier having a feedback loop, said feedback loop including a first resistor having a resistance inversely related to the voltage thereacross, and a second resistor connected in parallel about said first resistor, and means for selectively connecting all said generators either in series or in parallel to each other, said analog controller having capacity to generate non-linear functions of said input in accordance with similar functions of a chemical conversion process.

References Cited by the Examiner

UNITED STATES PATENTS

| | | | |
|---|---|---|---|
| 2,662,197 | 12/1953 | Comte | 315—24 |
| 2,823,274 | 2/1958 | Casey | 328—178 |

(Other references on following page)

UNITED STATES PATENTS

| | | | |
|---|---|---|---|
| 3,027,515 | 3/1962 | Clark et al. | 328—178 X |
| 3,044,704 | 7/1962 | Anke et al. | 235—184 |
| 3,141,968 | 7/1964 | Stubbs et al. | 235—184 X |
| 3,211,901 | 10/1965 | Comley et al. | 235—197 |

OTHER REFERENCES

Nikiforuk, P. N., A Technique for Non-Linear Function Generation. In Electronic Engineering, pp. 118–119, March 1955.

Brown, E. et al.: The Design of Function Generators Using Silicon Carbide Non-Linear Resistors. In Electronic Engineering, pp. 154–157, March 1958.

MALCOLM A. MORRISON, *Primary Examiner.*

I. KESCHNER, *Assistant Examiner.*